US008804880B2

(12) United States Patent
Rousseaux et al.

(10) Patent No.: US 8,804,880 B2
(45) Date of Patent: Aug. 12, 2014

(54) METHODS FOR FAST AND LOW-POWER UWB IR BASEBAND RECEIVER SYNCHRONIZATION

(75) Inventors: Olivier Rousseaux, sint-Joost-ten-Node (BE); Li Huang, Eindhoven (NL); Mladen Berekovic, Hemmingen (DE); Dries Neirynck, Dublin (IE)

(73) Assignee: IMEC, Leuven (BE)

( * ) Notice: Subject to any disclaimer, the term of this patent is extended or adjusted under 35 U.S.C. 154(b) by 292 days.

(21) Appl. No.: 13/003,378

(22) PCT Filed: Jul. 13, 2009

(86) PCT No.: PCT/EP2009/058931
§ 371 (c)(1),
(2), (4) Date: Mar. 14, 2011

(87) PCT Pub. No.: WO2010/004055
PCT Pub. Date: Jan. 14, 2010

(65) Prior Publication Data
US 2011/0150044 A1  Jun. 23, 2011

Related U.S. Application Data

(60) Provisional application No. 61/093,289, filed on Aug. 29, 2008.

(30) Foreign Application Priority Data

Jul. 11, 2008 (EP) ..................... 08160252

(51) Int. Cl.
*H04L 27/06* (2006.01)
(52) U.S. Cl.
USPC ............................ 375/343; 370/320; 708/300

(58) Field of Classification Search
USPC ........................................................ 375/343
See application file for complete search history.

(56) References Cited

U.S. PATENT DOCUMENTS 6,442,145 B1 * 8/2002 De Lange et al. ............. 370/310
6,671,310 B1   12/2003 Richards et al.
(Continued)

FOREIGN PATENT DOCUMENTS

EP   1503513   2/2005
EP   1562297   8/2005
(Continued)

OTHER PUBLICATIONS

Desset, Claude et al., "UWB Search Strategies for Minimal-Length Preamble and a Low-Complexity Analog Receiver", SPAWC—Signal Processing Advances in Wireless Communications, Cannes, France, Jul. 2006, 5 pages.

(Continued)

Primary Examiner — Santiago Garcia
(74) Attorney, Agent, or Firm — McDonnell Boehnen Hulbert & Berghoff LLP

(57) ABSTRACT

The invention relates to methods for synchronizing a device to a signal containing a train of pulses representing a programmable number of repetitions of a predetermined code. Pulse position and code phase are searched for. In a first aspect, a programmable number of samples is taken per pulse frame in function of the available number of repetitions of said predetermined code. In a second aspect, the method comprises a signal detection stage from which, after performing a confirmation stage, information can be kept for a subsequent stage. In a third aspect, only a limited number of rotated versions of the predetermined code are checked, using a presumed code phase which is kept from a preceding stage.

18 Claims, 8 Drawing Sheets

(56) References Cited

U.S. PATENT DOCUMENTS

| | | | |
|---|---|---|---|
| 6,788,730 B1 * | 9/2004 | Richards et al. | 375/138 |
| 2004/0136439 A1 * | 7/2004 | Dewberry et al. | 375/130 |
| 2007/0133720 A1 * | 6/2007 | Rivaz et al. | 375/343 |
| 2008/0025386 A1 * | 1/2008 | Desset et al. | 375/239 |

FOREIGN PATENT DOCUMENTS

| | | |
|---|---|---|
| EP | 1701453 | 9/2006 |
| EP | 1701454 | 9/2006 |
| EP | 1873924 | 1/2008 |
| WO | WO96/41432 | 12/1996 |

OTHER PUBLICATIONS

IEEE Standard, "Part 15.4: Wireless Medium Access Control (MAC) and Physical Layer (PHY) Specifications for Low-Rate Wireless Personal Area Networks (WPANs), Amendment 1: Add Alternative PHYs", IEEE Std. 802.15.4a, 2007.

International Search Report and Written Opinion, International Application No. PCT/EP2009/058931 dated Mar. 1, 2010.

Partial International Search Report, International Application No. PCT/EP2009/058931 dated Jan. 14, 2010.

* cited by examiner

METHODS FOR FAST AND LOW-POWER UWB IR BASEBAND RECEIVER SYNCHRONIZATION

CROSS-REFERENCE TO RELATED APPLICATIONS

The present application is a national stage application of International Patent Application No. PCT/EP2009/058931 filed Jul. 13, 2009, which claims priority to U.S. Provisional Application 61/093,289 filed Aug. 29, 2008, and European patent application EP 08160252.6 filed Jul. 11, 2008, the contents of which are incorporated by reference herein in their entirety.

TECHNICAL FIELD

The present invention relates to methods for determining pulse position and code phase in a signal, in particular for UWB IR baseband receivers.

BACKGROUND ART

In the IEEE 802.15.4a amendment, an ultra-wideband (UWB) physical layer (PHY) based on an impulse radio signaling scheme using band-limited pulses is specified. Furthermore, the format of an UWB frame is described, consisting of three major components: the Synchronization Header Preamble (SHR), the PHY Header (PHR) and the Physical Layer Service Data Unit (PSDU). The SHR preamble that is being added prior to the PHR could be used to aid receiver algorithms that perform packet synchronization.

Ultra wideband (UWB) systems have received great attention recently due to their distinctive advantages over conventional narrowband systems. First, they have low sensitivity to severe multipath fading and jamming. Second, they enable accurate positioning and ranging. Third, they coexist well with current wireless systems and have low probability of intercept. Fourth, they provide good flexibility to trade off between data rate and power consumption.

In practice, the receiver needs to know the timing information of the received signal to accomplish demodulation. The procedure that estimates the timing information is referred to as the synchronization. In this procedure, the receiver has to search all possible positions in order to find the location where the received signal can be recovered with maximal energy. Performing synchronization is especially difficult in UWB systems due to the large search space, which mainly results from the very fine resolution of the timing uncertainty region and the long spreading code.

Synchronization algorithms can be used to determine three sampling positions: first, the pulse-level position, i.e. the position where the pulses appear in pulse duration; second, the code-level position, i.e. the position where pulses start to be combined to form one symbol; third, the bit-level position, i.e. the position where the data payload effectively starts. The offsets between the sampling position and the ideal position are referred to as the pulse-, code-, and bit-level offsets, respectively.

In literature, there are two possible acquisition strategies searching for the pulse- and code-level positions: either searching first for the pulse-level position afterwards for the code-level position, or jointly searching for both positions. The first strategy in principle requires a smaller search space compared with the second strategy as the searching of two positions is decoupled. However, this strategy suffers from a poor energy accumulation when searching for the pulse-level position. This is undesirable for ultra-low power systems where the transmit power is very small for an isolated pulse. In addition, this first strategy requires a longer preamble as the two positions are searched sequentially.

Synchronization algorithms are for example known from WO-A-96/41432 and US-A-2004/136439.

DISCLOSURE OF THE INVENTION

It is an aim of this invention to provide a method for determining pulse position and code phase which has a lower computational complexity.

This aim is achieved according to a first aspect of the invention with the method comprising all the steps of claim 9.

This aim is achieved according to a second aspect of the invention with the method comprising all the steps of claim 15.

This aim is achieved according to a third aspect of the invention with the method comprising all the steps of claim 1.

The first, second and third aspects of the invention may or may not be combined with each other in various embodiments according to the invention.

As used herein, the "actual pulse position" is intended to mean the position of the strongest among a possible plurality of pulse reflections in a received signal.

In all aspects mentioned below, the method of the invention preferably relies on the strategy to jointly search for both the pulse- and code-level positions. This minimizes the required preamble length and takes advantage of the energy accumulation resulting from coherent chip combination.

The first aspect of the invention relates to a method for synchronising a device to a signal containing a train of pulses representing a programmable number of repetitions of a predetermined code. The signal comprises a sequence of pulse frames. Each pulse frame contains one of the pulses at one of a plurality of discrete (i.e. non-overlapping) possible pulse positions which can be distinguished within the pulse frame. In other words, the pulse frame length is equal to the pulse repetition period. The number of discrete possible pulse positions in one pulse frame is defined as the spreading factor L of the signal.

The synchronisation process comprises determining the actual position of the pulses in the pulse frames and a code phase of the train of pulses with respect to the predetermined code. This is done according to the invention by the following steps: (a) sampling the signal in such a way that N samples are obtained for each sampled pulse frame with N≤L; (b) applying a variable sampling delay during sampling, such that all the possible pulse positions can be covered (after sampling a given number of the pulse frames); (c) correlating the obtained samples with rotated versions of the predetermined code; and (d) determining the actual pulse position and the code phase from the correlation.

According to the first aspect of the invention, the number N of samples taken in each pulse frame is programmable and an initial step is performed to set this number N in function of the available number of repetitions of the predetermined code.

In embodiments according to the first aspect of the invention, the predetermined code can for example be the spreading code which is applied to each of a sequence of predetermined symbols upon generating the signal. The number of symbols, i.e. the number of repetitions of the predetermined code, can for example be 16, 64, 1024 or 4096 and define a number of modes between which a selection can be made. The spreading factor L and the length of the predetermined code (i.e. the number of values composing said code) may also depend on the mode used. The advantage is that on receiver side, the sampling process can also be varied according to the used mode, with the effect of reducing the computational complexity when possible. For example when more code repetitions (or symbols) are available, a lesser number of samples per pulse frame can be sufficient.

As used herein, with the repetition of the predetermined code is to be understood that the code is repeated, though not necessarily in the same form. For example in the case of the spreading code mentioned above, the symbols which are encoded with it have usually the same values but the value may also vary.

In embodiments according to the first aspect of the invention, the N samples can be taken spaced apart from each other, i.e. at non-adjacent possible pulse positions. Alternatively, the N samples can also be taken successively, i.e. at adjacent possible pulse positions, which can for example be done by applying a duty cycle. The sampling rate is preferably at least the pulse repetition rate. Furthermore, coarse and fine synchronisation stages can be used if it is desired that the actual pulse position can be detected at a higher granularity than the number of discrete possible pulse positions per pulse frame.

The second aspect of the invention relates to a method for synchronising a device to a signal containing a train of pulses representing a number of repetitions of a predetermined code. The signal comprises a sequence of pulse frames. Each pulse frame contains one of the pulses at one of a plurality of discrete (i.e. non-overlapping) possible pulse positions which can be distinguished within the pulse frame. In other words, the pulse frame length is equal to the pulse repetition period. The number of discrete possible pulse positions in one pulse frame is defined as the spreading factor L of the signal. The method comprises a signal detection stage with the following steps: (e) selecting a sampling delay; (f) sampling said signal with said selected sampling delay in such a way that a number of samples N is obtained for each sampled pulse frame with $N \leq L$, thereby obtaining a first set of samples covering at least the length of said predetermined code; (g) correlating said first set of samples with rotated versions of said predetermined code, thereby obtaining a set of correlation values; (h) comparing each of said correlation values with a noise threshold to determine presence of a signal, thereby obtaining a comparison result, (i) if said comparison result reveals that no signal is present, repeating steps (e) to (h) for a different sampling phase, and (j) if said comparison result reveals that a signal is present, going to a confirmation stage to determine correctness of said comparison result.

The purpose of the confirmation stage is to avoid false alarms, i.e. that presence of a signal would be detected as a result of a noise level above the noise threshold, whereas actually no signal is present. But the addition of the confirmation stage has the advantage that the pulse position and code phase which are determined in the signal detection stage anyway, are evaluated. If the confirmation stage reveals that the pulse position and code phase determined in the signal detection stage correctly indicate presence of a signal, they can be outputted towards a subsequent stage in the synchronisation process as a preliminary result, i.e. a presumed actual pulse position and presumed code phase. In this way, possibly multiple stages of the synchronization process can be skipped.

The confirmation stage preferably comprises the following steps: (k) re-sampling said signal with the last selected sampling delay, thereby obtaining a second set of samples covering at least the length of said predetermined code; (l) correlating said second set of samples with said rotated version of said predetermined code for which presence of a signal was determined in steps (g) and (h), thereby obtaining a confirmation result; (m) if said confirmation result reveals that no signal is present, returning to step (e), and (n) if said confirmation result confirms that a signal is present, going to a subsequent stage for determining said actual pulse position and said code phase. Preferably at least the determined code phase is taken along as a presumed code phase.

The third aspect of the invention relates to a method for synchronising a device to a signal containing a train of pulses representing a number of repetitions of a predetermined code. The signal comprises a sequence of pulse frames. Each pulse frame contains one of the pulses at one of a plurality of discrete (i.e. non-overlapping) possible pulse positions which can be distinguished within the pulse frame. In other words, the pulse frame length is equal to the pulse repetition period. The number of discrete possible pulse positions in one pulse frame is defined as the spreading factor L of the signal. The method makes use of a presumed code phase which is kept from a previous stage, such as for example a signal detection stage in which a presumed code phase is determined simultaneously with detection of presence of a signal, e.g. according to the above described second aspect. The method comprises the following steps: (o) sampling said signal in such a way that a number of samples N is obtained for each sampled pulse frame with $N \leq L$; (p) applying a variable sampling delay during said sampling, such that all of said possible pulse positions are covered and a set of samples is obtained with at least one sample at each of the possible pulse positions; (q) correlating said set of samples with a limited number of rotated versions of said predetermined code, said limited number of rotated versions being below the total number of possible rotated versions and being selected by means of said presumed code phase; and (r) determining the actual pulse position and the code phase from said correlation. In other words, a previously determined code phase is presumed to be correct and only a limited number of rotated versions of the code, chosen on the basis of the presumed code phase is used in the further synchronisation process. In this way, possibly multiple stages of the synchronization process can be skipped.

Preferably, said limited number of rotated versions is selected around said predetermined code rotated by said presumed code phase. For example, said limited number of rotated versions of said code may comprise said code rotated by said presumed code phase, said code rotated by said presumed code phase minus one and said code rotated by said presumed code phase plus one.

Preferably, said limited number is programmable in function of a channel delay spread of a channel over which said signal is transmitted.

BRIEF DESCRIPTION OF THE DRAWINGS

The invention will be further elucidated by means of the following description and the appended drawings.

MODES FOR CARRYING OUT THE INVENTION

Figure 1:
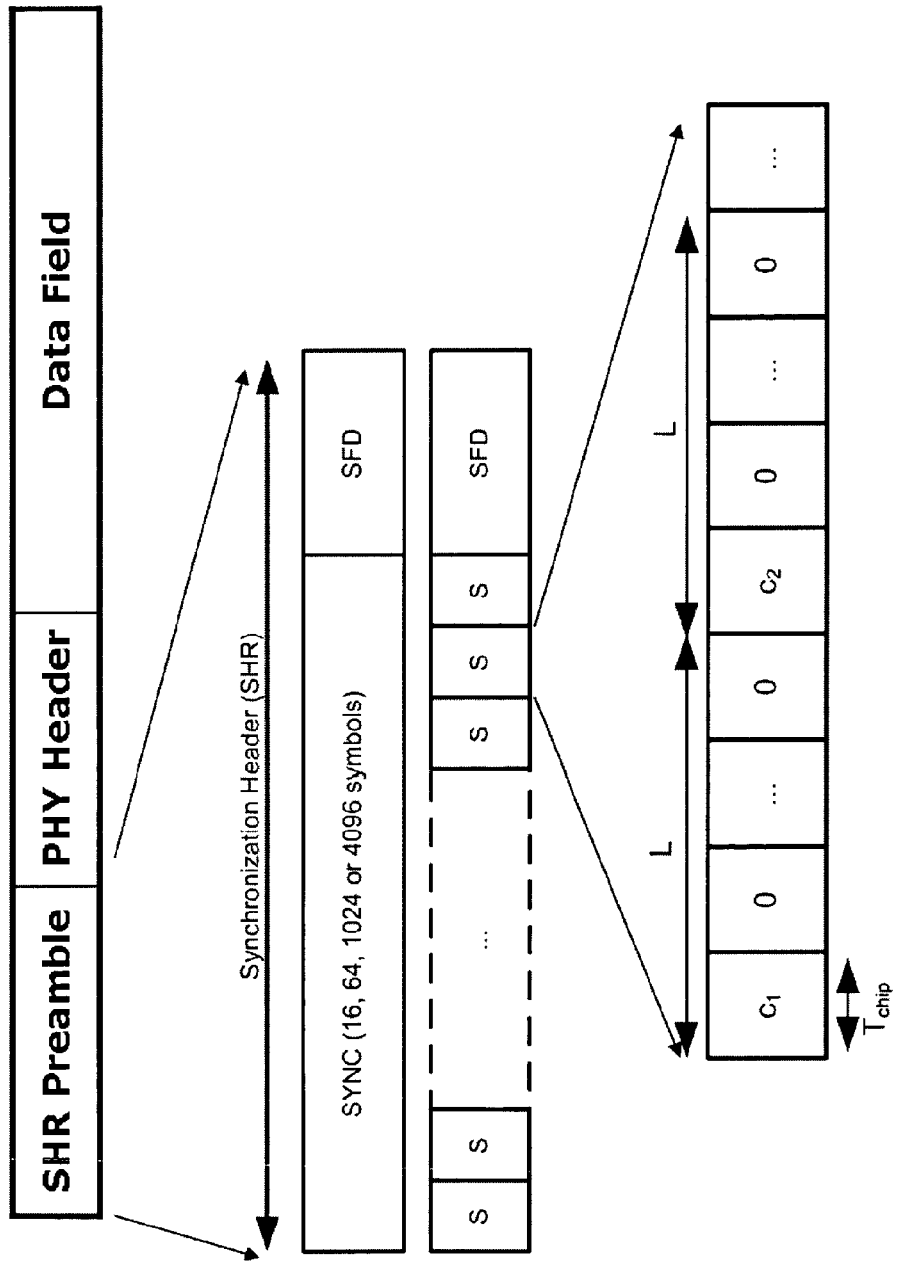
FIG. 1 shows a data packet structure which may be used in connection with embodiments of the method of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The proposed method is intended to speed up the packet synchronization, i.e. finding the correct sampling instances to acquire the UWB pulses that make up the synchronisation header (SHR) symbols. This is also beneficial for reducing the amount of symbols required for synchronization as well as supporting modes defined in the amendment that only use a very low number of SHR symbols.

The proposed method is suitable for both isolated pulse based and IEEE 802.15.4a based systems.

FIG. 1 shows the structure of one data packet, comprising an SHR Preamble preceding a PHY Header, in turn preceding the Data Field. For a deeper understanding of the proposed method, a short explanation of the structure of the SHR is given. The SHR comprises two parts: the SHR Synchronization (SYNC) field and the Start Frame Delimiter (SFD). For the proposed method and device, we mainly consider the SYNC field.

The SYNC field comprises a programmable number of identical SHR symbols s with the number being e.g. 16, 64, 1024 or 4096 (determined by the used mode). One SHR symbol itself is constructed by taking one of the predefined ternary preamble codes (=spreading code for SHR) and further spreading it with a delta function $\delta_L$. The spreading factor L and the ternary code length $L_{sc}$ are dependent on the mode used.

For a spreading code length of e.g. 31 and a spreading factor L of 16 we obtain 31 symbol parts (pulse frames) of length 16 times $T_{chip}$ (with for example $T_{chip}$=2 ns). Usually, upon encoding the signal, the first time slot of the pulse frame is the actual pulse position (containing a pulse $c_2, \ldots, c_{Lsc}$, with value −1, 0 or 1), and the remaining slots are always zero, i.e. empty possible pulse positions, as shown in FIG. 1. So each pulse frame contains one pulse at one of L possible pulse positions.

A method for finding packet synchronization using the SYNC field of the SHR is proposed below and specified in multiple embodiments containing changes with respect to each other.

Figure 2:
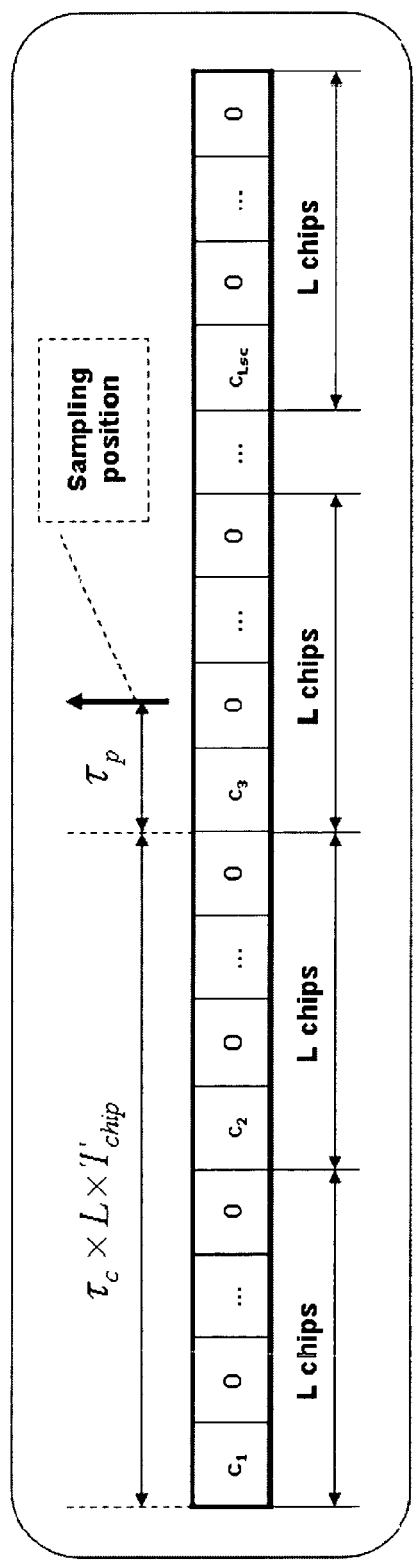
FIG. 2 explains the pulse- and code-level timing offsets (actual pulse position and code phase) which need to be determined in synchronisation processes according to the invention.

In all embodiments, an actual pulse position and a code phase are determined for the purpose of synchronization as explained in FIG. 2. In order to synchronise to a signal, a timing offset (delay) needs to be determined which is composed of two components: a code phase or code-level offset $\tau_c \times L \times T_{chip}$ and a sampling delay or pulse-level offset $\tau_p$. Herein, $\tau_c$ is an integer with $0 \leq \tau_c < L_{sc}$ (spreading code length) and the range of $\tau_p$ is $0 \leq \tau_p < L \times T_{chip}$. The resolution of $\tau_p$ may be different in different stages of the synchronization process, e.g. in a coarse stage and a fine stage as in some embodiments described below.

1st Embodiment

No Averaging, Extensive Fine Synchronization Search

Figure 3:
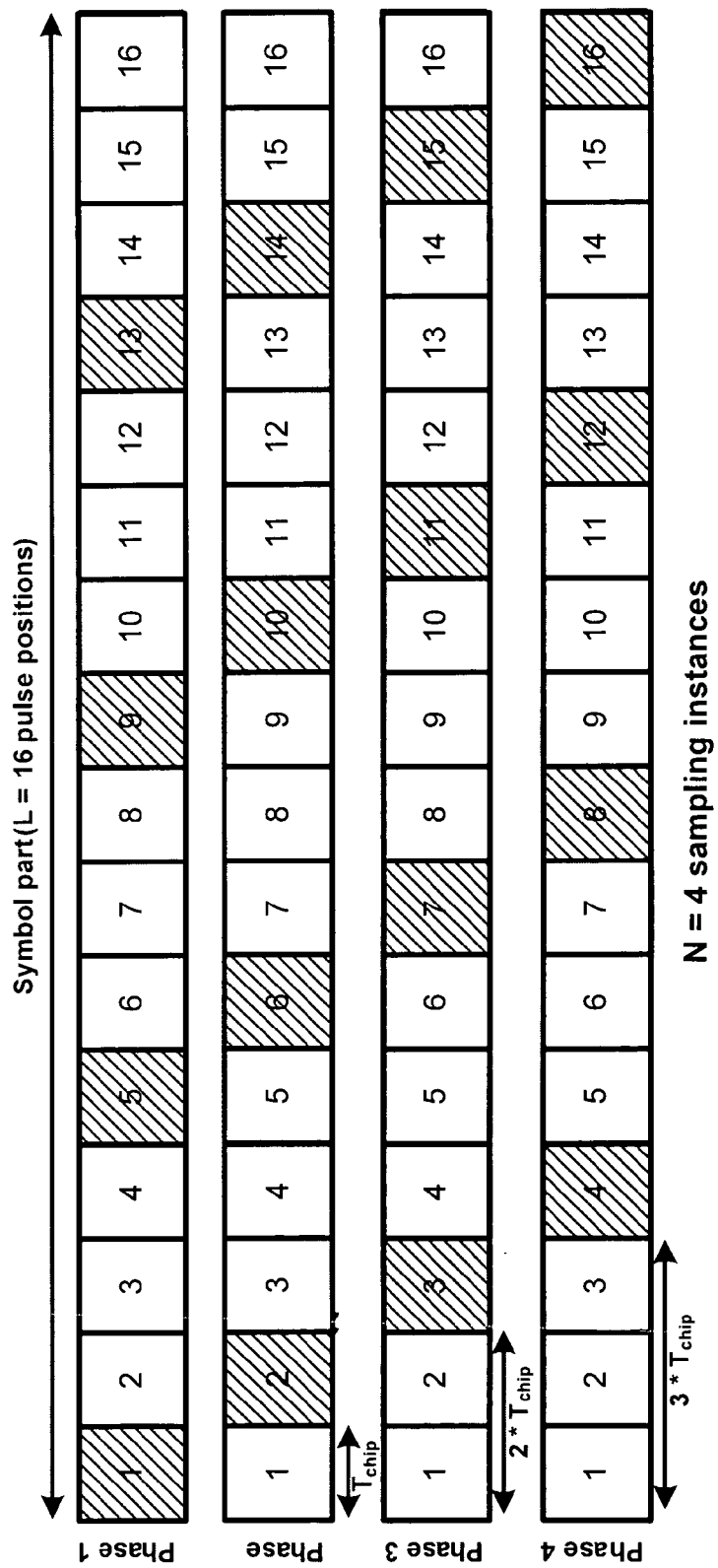
FIGS. 3 and 4 show two examples of how embodiments of the method according to the invention use multiple synchronization phases for testing all possible pulse positions.
Figure 4:
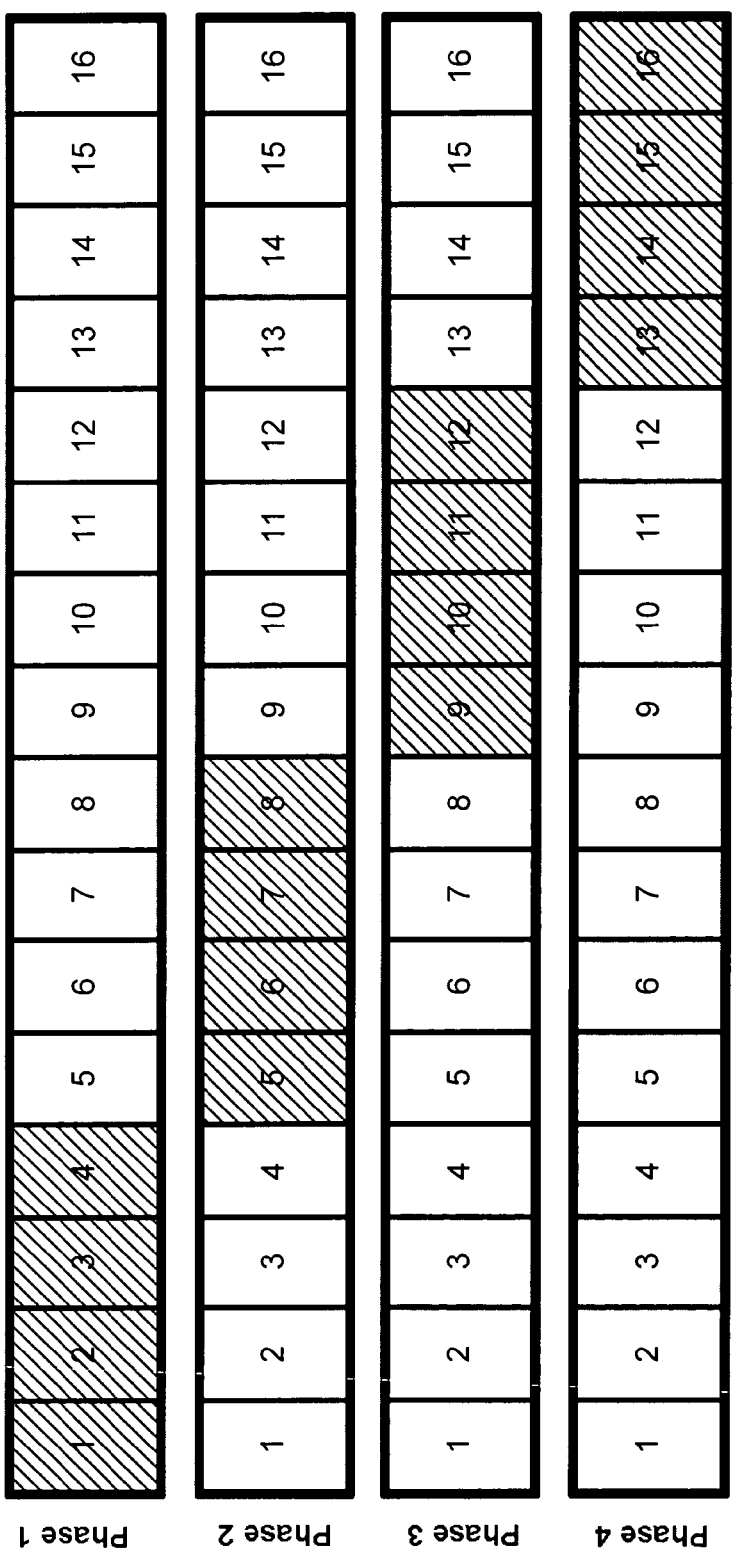

For one symbol, each symbol part is sampled N times. Note that the choice of N is a trade-off between the duty-cycling gain and the amount of symbols required for synchronization. Further, the interval between adjacent samples could be arbitrary. For example, to reduce the searching space, we could sample at every 4 possible pulse positions as shown in FIG. 3. However, to maximize the duty-cycling gain in practical implementation where the start time of the front-end is taken into account, we could consecutively sample N times instead as shown in FIG. 4.

As a result, we introduce multiple synchronization phases in order to test all possible pulse positions and cover the full length of the pulse frame. Between two consecutive phases, we shift the sampling instances by a certain amount of time to reach the next N possible pulse positions, i.e. we apply a different sampling delay. For example, as illustrated in FIG. 3, we can circularly shift the sampling instance by $T_{chip}$ between two consecutive phases. But note that between two different consecutive phases, the sampling instances to be shifted are not required to be the same. For this reason, interchanging the sequence of Phases 2 and 3 in FIG. 3 is still within the scope of the invention. In the example of FIG. 4 with consecutive sampling, we can circularly shift the sampling instance by $N \times T_{chip}$ between two consecutive phases as shown, or apply different sampling delays so that Phases 2 and 3 are interchanged.

The proposed synchronization method starts with a coarse synchronization stage, which is herein also called the signal detection stage, and is followed by a fine synchronization stage. These two stages differ in the granularity with which possible pulse positions are scanned. In the coarse stage, the interval between the considered pulse positions is $T_{chip}$. Hence, a total of L possible pulse positions are considered for a symbol part (pulse frame) of length L. In the fine stage, the interval becomes for example $T_{chip}/2$ to achieve a finer resolution. This means that 2*L possible pulse positions are considered, though this number can be decreased as in the $3^{rd}$ embodiment of the method below.

The number of phases needed for the coarse acquisition stage considering a number of samples N taken per symbol part can hence be given by L/N. FIGS. 3 and 4 illustrate this for L=16 pulse positions per symbol part and N=4 samples taken in each phase. Hence 4 phases are needed to consider all considered pulse positions. For the fine acquisition stage, this number doubles as 2*L pulse positions are considered.

We use N FIFO buffers to store each of the N samples in a separate buffer. After sampling a whole symbol, all N buffers are filled with $L_{SC}$ samples (see FIG. 5). These buffers function to convert the obtained samples from serial to parallel data.

Figure 6:
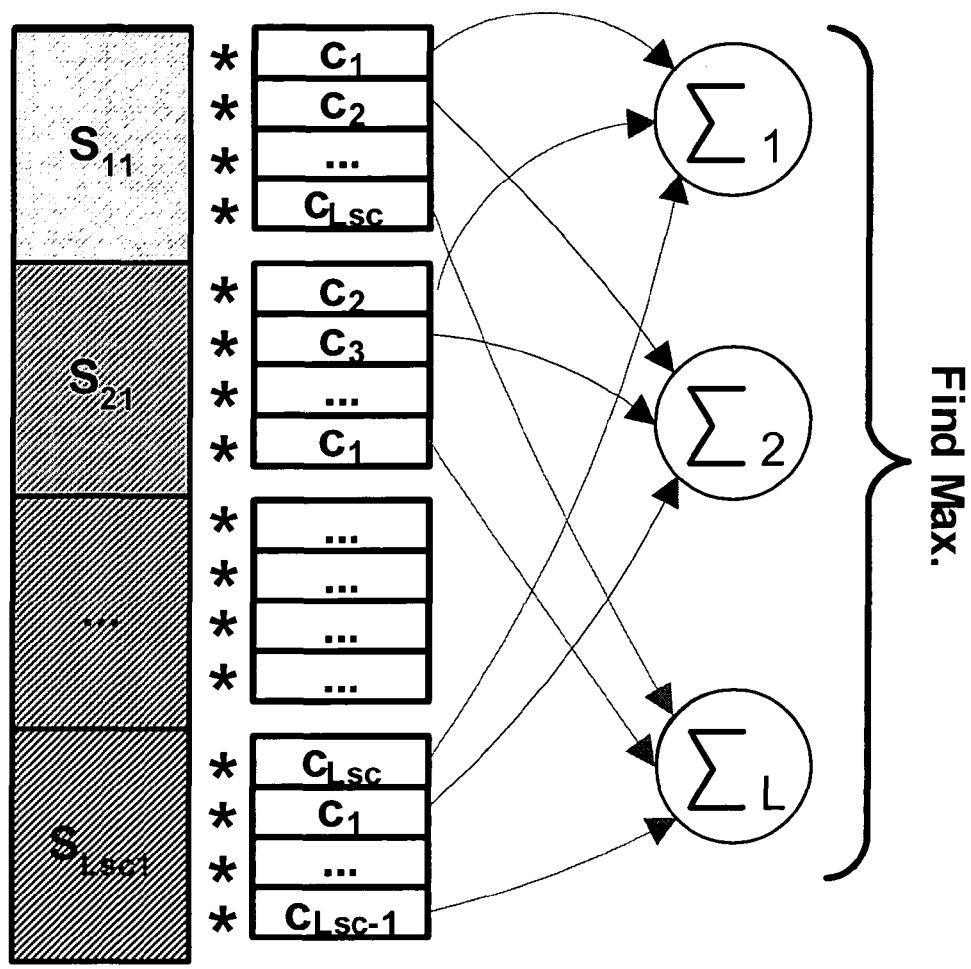
FIG. 6 shows how embodiments of the method according to the invention find a maximum of all correlations of sample sets with rotated versions of the code to determine pulse position and code phase.

For each synchronization phase, the following steps are executed:
  For each buffer, we calculate all correlations with all possible rotations of the spreading code (see FIG. 6).
  After that, the maximum of all correlations of all possible rotations of the spreading code and all buffers is determined (see FIG. 6).

Figure 7:
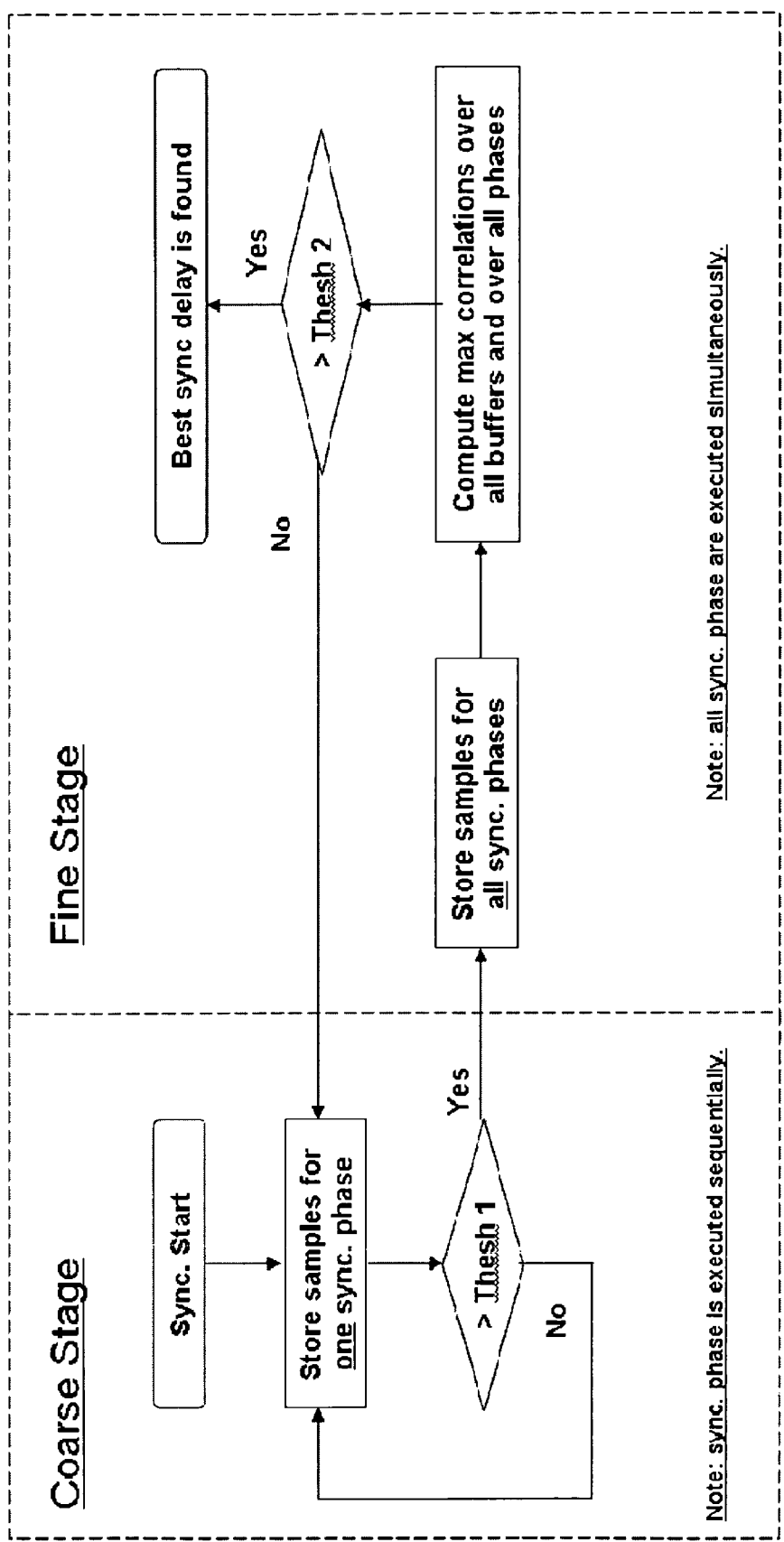
FIG. 7 shows a flowchart of a preferred embodiment of a method according to the invention.

During the coarse acquisition stage, we keep looping through the different synchronization phases sequentially (see FIG. 7). When one synchronization phase is executed, the corresponding maximum is compared with a threshold derived from a noise estimation algorithm. If the maximum is larger than the threshold, we conclude that a signal is present. Then, the coarse acquisition stage is stopped and the fine synchronization stage is started. Otherwise, the coarse acquisition stage is continued. When all the L/N synchronization phases are executed and the synchronization method is still in the coarse acquisition stage, we proceed from phase 1 again. It is also possible that not all the synchronization phases have been processed when the fine synchronization stage is started.

Unlike the coarse acquisition stage, we process all the synchronization stages simultaneously during the fine acquisition stage (see FIG. 7). The maximum value of the set of maximums obtained from all synchronization phases represents the best synchronization delay. To prevent false positive alarms, this maximum value can be compared with a threshold derived from the maximum obtained in the coarse stage. In case the new maximum value is above the threshold, the best synchronization delay is found. Otherwise, the synchronization method returns to the coarse synchronization stage.

$2^{nd}$ Embodiment

Averaging, Extensive Fine Synchronization Search

In a second embodiment of the method, we store the samples, which are averaged over M symbols, into the FIFO buffers instead of those obtained from one single symbol as introduced in the first embodiment.

The additional averaging process in this embodiment has the advantage of reducing the variance of noisy signals and thereby increases the reliability of the synchronization method in poor SNR scenarios. In fact, this averaging process is preferred to achieve reasonable synchronization errors in different channel conditions specified by the standard. Furthermore we can use this second embodiment to ease the computational burden for low speed systems. Since we average the content of the FIFOs over M symbols before performing the correlation operation, the calculation time of all correlations can be spread over M symbol periods reducing the need for high clocking frequencies.

It has to be noted though that the number of SHR symbols needed to find synchronization can consequently increase by a factor M, which is the price to pay to perform synchronization in poor SNR conditions.

$3^{rd}$ Embodiment

Averaging, Short Fine Synchronization

In order to reduce the number of needed SHR symbols, we consider a third embodiment of the method where only a part of all possible synchronization phases are considered during the fine synchronization stage.

Note that in the above described embodiments of the method the fine synchronization stage doubles the number of synchronization phases compared with the coarse synchronization stage. In addition, all the synchronization phases in the coarse synchronization stage remain the same in the fine synchronization stage. Therefore, in this embodiment, we will not process all the 2L/N synchronization stages during the fine acquisition stage. Instead, we perform two steps in the fine synchronization stage. In the first step, we process L/N synchronization phases that also exist in the coarse synchronization stage. The maximum from these phases is used for roughly determining the suspected pulse positions. Then, in the second step, only a small interval around the maximum energy positions found in the first step (i.e. suspected location of the actual maximums) are considered for fine synchronization. Hence the number of phases needed for fine synchronization stage can be significantly reduced compared with the extensive fine synchronization mentioned above.

The number of L/N synchronisation phases mentioned in the previous paragraph is an example. In general, the resolution in the fine synchronization stage might be finer or even more coarse compared with the coarse synchronization stage. In other words, the number of synchronization stages could be different from that in the coarse synchronization stage.

$4^{th}$ Embodiment

When the coarse synchronization stage was successful and a maximum above the threshold for a given code phase and delay combination is found, the corresponding code phase or its neighboring circularly shifted versions are expected to be the correct code phase. Therefore, in the fourth embodiment we restrict the search to a small number of possible code phases during the fine synchronization stage. Moreover, in the second step of the fine synchronization stage as discussed in the third embodiment above, we can restrict ourselves to the code phase that is obtained in the first step.

To further reduce the complexity and power consumption, we could assume that the obtained code phase during the coarse synchronization stage is correct and consider only this code phase in the fine synchronization stage, at the price of increasing synchronization errors in poor SNR conditions. When an acceptable delay-code rotation is found, there may be no need to test other rotations: the code-level synchronization has been found unless it was a false alarm. In order to avoid false alarms, the delay-code phase combination obtained can be re-tested several times between the coarse and fine synchronization, as is described herein as the confirmation stage. If this test confirms that the delay-code phase combination is correct, we can restrict the search to one code phase and skip the computationally demanding code phase rotation in the fine synchronization stage. If this test indicates that it was a false alarm, the coarse acquisition stage is resumed.

Figure 5:
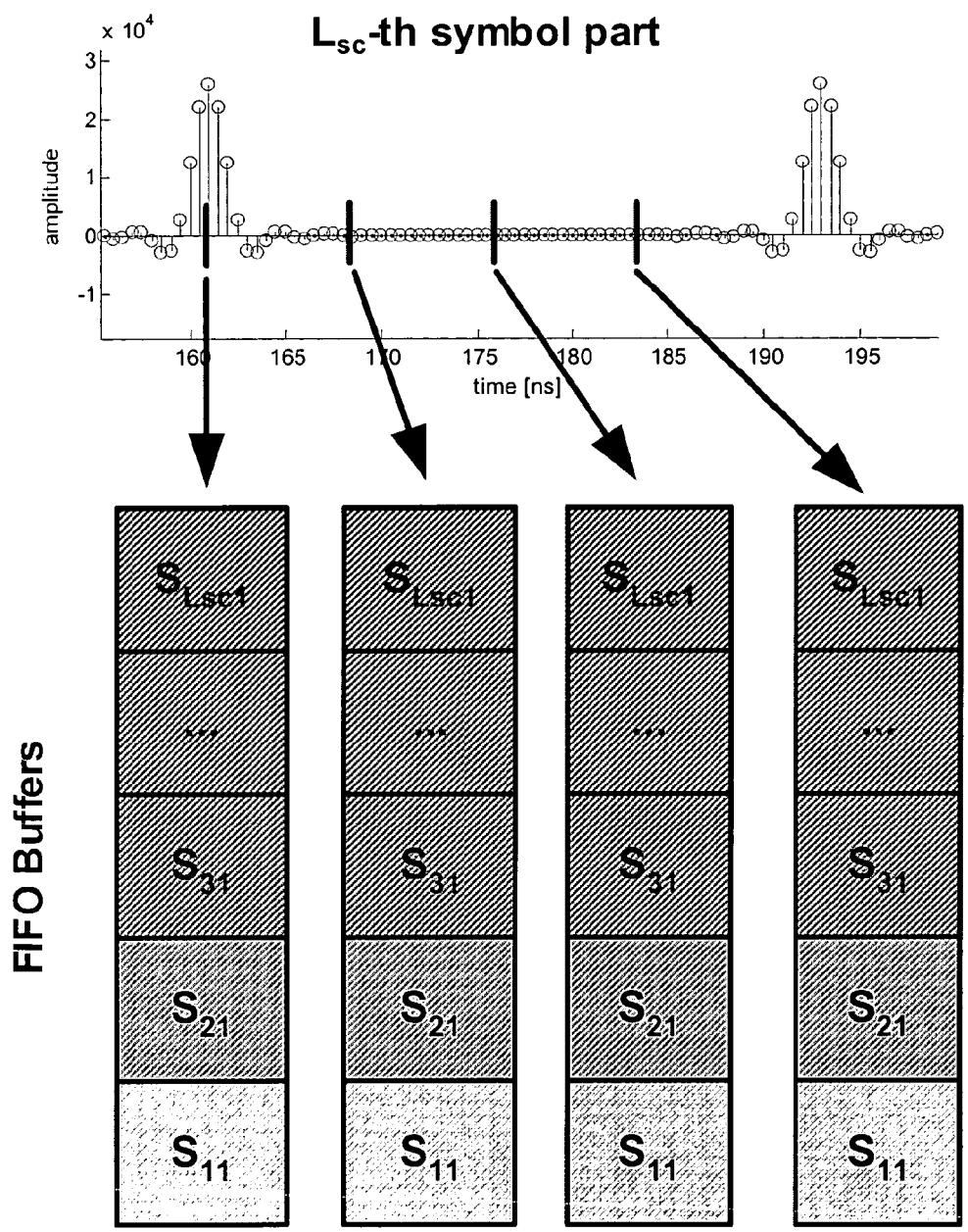
FIG. 5 shows the FIFO Buffer State in a device implementing the invention after reception of symbol part $L_{sc}$.

This fourth embodiment reduces the burden on the processor, which could process more vectors in parallel (increase the number of columns in FIG. 5). The upper bound on the number of parallel vectors is given by the max speed of the ADC. If the processor can follow at that speed without extra overhead, this reduces the size of the required preamble. If the available preamble is long, however, we can keep the same number of vectors but the burden on the processor is then reduced.

Figure 8:
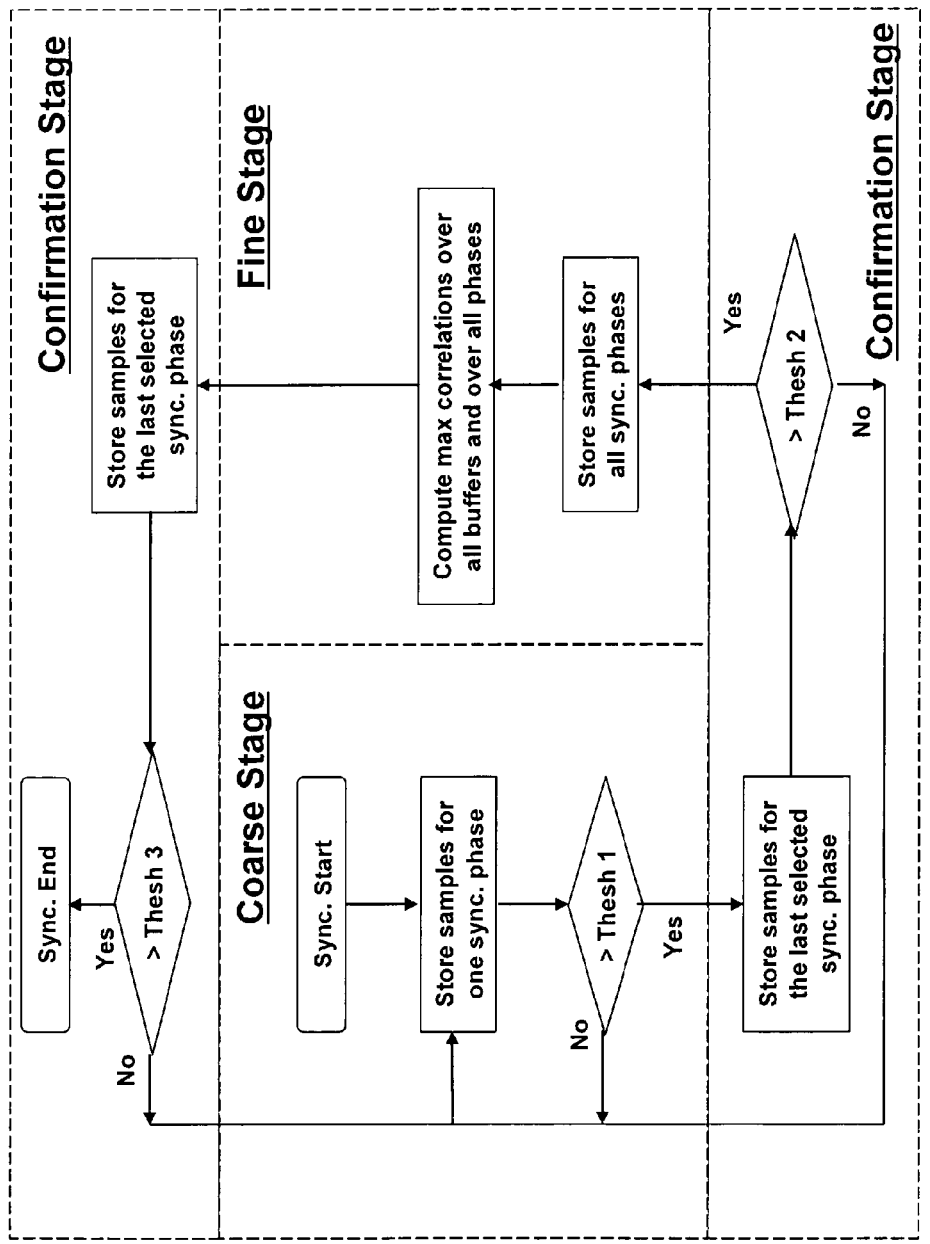
FIG. 8 shows a flowchart of another preferred embodiment of a method according to the invention.

FIG. 8 shows a flowchart of this fourth embodiment. Note that there can be additionally a final confirmation stage after the fine synchronization stage.

Further Embodiments

In the above, knowledge about the expected code phase of the signal, obtained from the coarse confirmation stage and confirmation, were used to limit the number of code phases tested in the fine synchronisation stage. According to the invention, it also is possible to use other scenarios in which knowledge about the expected value of the code phase can be exploited to reduce the number of code phases tested.

Assuming the environment and the distance between transmitter and receiver do not change significantly from one packet to the next, the expected code phase will be the same. This assumption can be exploited to limit the number of code phases tested in all stages of the synchronisation, for example in streaming applications. This can bring the above mentioned benefits of reducing complexity and power consumption during synchronisation.

The invention claimed is:

1. A method, comprising:
   receiving a predetermined code phase from a course synchronization stage;
   receiving a signal comprising at least one pulse and a plurality of pulse frames, wherein each pulse frame comprises a number L of discrete possible pulse positions and the at least one pulse is located at an actual pulse position within the plurality of pulse frames;
   applying a varying sampling delay to repeatedly sample the signal to obtain a number N of samples, wherein N is less than or equal to L, and wherein the number N of samples includes at least one sample at each of the L discrete possible pulse positions;
   correlating the number N of samples with at least one rotated version of a predetermined code to determine a plurality of correlations, wherein the at least one rotated version is selected from a plurality of predetermined limited rotated versions based on the predetermined code phase, and wherein the plurality of predetermined limited rotated versions include fewer than all possible rotated versions; and
   based on the correlations, determining the actual pulse position and a code phase of the signal, wherein the code phase is a phase of the signal with respect to the predetermined code.

2. The method of claim 1, wherein the at least one rotated version of the predetermined code being selected based on the predetermined code phase comprises rotating the predetermined code by the code phase.

3. The method of claim 2, wherein the at least one rotated version of the predetermined code comprises the predetermined code rotated by the code phase, the predetermined code rotated by the code phase plus one, and the predetermined code rotated by the code phase minus one.

4. The method of claim 1, wherein the at least one rotated version of the predetermined code comprises a number of rotated versions, the number being programmable as a function of a channel delay spread of a signal over which the signal is received.

5. The method of claim 1, wherein correlating the number N of samples with the at least one rotated version of the predetermined code to determine a plurality of correlations comprises:
   storing the number N of samples as serial data;
   converting the number N of samples to parallel data; and
   correlating the parallel data with the at least one rotated version of the predetermined code to determine the plurality of correlations.

6. The method of claim 5, wherein determining the actual pulse position and the code phase of the signal comprises selecting a maximum among the correlations.

7. The method of claim 6, wherein the actual pulse position comprises the maximum.

8. The method of claim 1, wherein the course synchronization stage is a signal detection stage that occurs substantially at the same time as the signal is received.

9. The method of claim 1, wherein the course synchronization stage is a synchronization stage of a previous pulse of the signal.

10. A method of synchronizing a device to a signal, comprising:
    selecting a number N as a function of an available number of repetitions of a predetermined code;
    receiving a signal comprising a plurality of pulse frames and a plurality of pulses that represent N, wherein each pulse frame comprises a number L of discrete possible pulse positions, wherein at least one pulse in the plurality of pulses is located at an actual pulse position within the plurality of pulse frames, and wherein N is less than or equal to L;
    sampling the signal to obtain N samples, wherein the N samples comprise at least one sample at each of the L discrete possible pulse positions;
    correlating the N samples with a plurality of rotated versions of the predetermined code to determine a first correlation;
    comparing the first correlation value with a noise threshold to determine if a signal is present;
    sampling the signal to obtain N times two samples, wherein the N times two samples comprise at least one sample at each of the L times two discrete possible pulse positions;
    correlating the N times two samples with a plurality of rotated versions of the predetermined code to determine a second correlation; and
    based on the second correlation, determining the actual pulse position of the at least one pulse and a code phase of the signal, wherein the code phase is a phase of the signal with respect to the predetermined code.

11. The method of claim 10, wherein correlating the N samples with the plurality of rotated versions of the predetermined code to determine the first correlation comprises:
    storing the N samples as serial data;
    converting the N samples to parallel data; and
    correlating the parallel data with the plurality of rotated versions of the predetermined code to determine the first correlation.

12. The method of claim 10, wherein determining the actual pulse position and the code phase of the signal comprises selecting a maximum among the at least one correlations.

13. The method of claim 10, wherein the N samples are taken at non-adjacent pulse positions.

14. The method of claim 10, wherein the N samples are taken at adjacent pulse positions.

15. The method of claim 10, further comprising increasing N and repeating the sampling, correlating, and determining steps with the increased N.

16. A method, comprising:

selecting a sampling delay;

receiving a signal comprising a plurality of pulse frames and a plurality of pulses that represent a number N selected as a function of an available number of repetitions of a predetermined code, wherein each pulse frame comprises a number L of discrete possible pulse position and at least one pulse in the plurality of pulses is located at an actual pulse position within the plurality of pulse frames, and wherein N is less than or equal to L;

sampling the signal to obtain a first set of N samples covering at least the length of the predetermined code, wherein the first set of samples comprises at least one sample at each of the L discrete possible pulse positions;

correlating the first set of samples with rotated versions of the predetermined code to obtain a first set of correlation values;

comparing each correlation value in the set of correlation values with a noise threshold to determine if a signal is present;

if a signal is not present, repeating the method with a new sampling delay; and if a signal is present, confirming the presence of the signal, wherein confirming the presence of the signal comprises:

resampling the signal with the sampling delay to obtain a second set of samples covering at least the length of the predetermined code; and correlating the second set of values with the rotated versions of the predetermined code to determine if a signal is present.

17. A method, comprising:

selecting a sampling delay;

receiving a signal comprising a plurality of pulse frames and a plurality of pulses that represent a number N selected as a function of an available number of repetitions of a predetermined code, wherein each pulse frame comprises a number L of discrete possible pulse position and at least one pulse in the plurality of pulses is located at an actual pulse position within the plurality of pulse frames, and wherein N is less than or equal to L;

sampling the signal to obtain a first set of N samples covering at least the length of the predetermined code, wherein the first set of samples comprises at least one sample at each of the L discrete possible pulse positions;

correlating the first set of samples with rotated versions of the predetermined code to obtain a first set of correlation values, comparing each correlation value in the set of correlation values with a noise threshold to determine if a signal is present;

if a signal is not present, repeating the method with a new sampling delay; and if a signal is present, determining the actual pulse position and a code phase of the signal, wherein the code phase is a phase of the signal with respect to the predetermined code.

18. The method of claim 17, further comprising, if the signal is present, outputting a presumed code phase, wherein the presumed code phase is related to at least one of (i) the rotated versions of the predetermined code and (ii) the sampling delay.

* * * * *

UNITED STATES PATENT AND TRADEMARK OFFICE
CERTIFICATE OF CORRECTION

PATENT NO. : 8,804,880 B2  
APPLICATION NO. : 13/003378  
DATED : August 12, 2014  
INVENTOR(S) : Olivier Rousseaux et al.

Page 1 of 1

It is certified that error appears in the above-identified patent and that said Letters Patent is hereby corrected as shown below:

On the title page, item [73] Assignee, please delete "IMEC, Leuven (BE)" and add -- Stichting IMEC Nederland, Eindhoven (NL) --.

Signed and Sealed this  
Fifth Day of April, 2016

Michelle K. Lee  
*Director of the United States Patent and Trademark Office*